United States Patent
Chun

(10) Patent No.: US 6,916,272 B2
(45) Date of Patent: Jul. 12, 2005

(54) APPARATUS FOR PREVENTING SUDDEN ACCELERATION OF AUTOMOBILE FITTED WITH AUTOMATIC TRANSMISSION

(75) Inventor: Song Jung Chun, 58-117, 7-Ga, Hang-Dong, Joong-Gu, Incheon 400-802 (KR)

(73) Assignee: Song Jung Chun, Incheon (KR)

( * ) Notice: Subject to any disclaimer, the term of this patent is extended or adjusted under 35 U.S.C. 154(b) by 0 days.

(21) Appl. No.: 10/264,994

(22) Filed: Oct. 4, 2002

(65) Prior Publication Data

US 2003/0153431 A1 Aug. 14, 2003

(30) Foreign Application Priority Data

Feb. 8, 2002 (KR) .......................................... 2002-7413
Jun. 29, 2002 (KR) .......................................... 2002-37319

(51) Int. Cl.⁷ ................................................. F02D 9/06
(52) U.S. Cl. ........................................................ 477/207
(58) Field of Search ................................. 477/207, 205, 477/206; 74/502.4, 502.6; 403/300, 302, 305, 306, 322.1, 321, 322.3; 180/335, 272

(56) References Cited

U.S. PATENT DOCUMENTS

| | | | |
|---|---|---|---|
| 2,248,747 A | * 7/1941 | Dick | 477/207 |
| 2,423,006 A | * 6/1947 | Chambers | 477/207 |
| 2,621,766 A | * 12/1952 | Patrick | 477/207 |
| 3,331,478 A | * 7/1967 | Trifletti et al. | 477/207 |
| 3,495,692 A | * 2/1970 | Holgate | 477/207 |
| 3,534,523 A | * 10/1970 | Davidson et al. | 53/505 |
| 3,750,780 A | * 8/1973 | Danek | 477/206 |
| 3,912,056 A | * 10/1975 | Neal | 477/207 |
| 4,940,109 A | * 7/1990 | Preston et al. | 180/197 |
| 5,002,146 A | * 3/1991 | Sakai | 180/197 |
| 5,411,452 A | * 5/1995 | Katayama | 477/206 |
| 5,439,429 A | * 8/1995 | Lee | 477/207 |
| 5,638,721 A | * 6/1997 | Lee | 74/502.4 |

* cited by examiner

Primary Examiner—Roger Pang
(74) Attorney, Agent, or Firm—Anderson Kill & Olick, P.C.; Eugene Lieberstein; Michael N. Meller

(57) ABSTRACT

The present invention relates to an apparatus for preventing sudden acceleration of an automobile fitted with an automatic transmission, including a first slider having one end thereof connected to a cable connected to an accelerator pedal, a second slider having one end thereof connected to a cable connected to a fuel injector and the other end thereof having a hollow into which the first slider is slidably inserted, and a locking device having a locking rod capable of being inserted into an insertion groove formed on the first slider through the second slider, a solenoid clutch for controlling movement of the locking rod by electric current and a locking rod reset spring for elastically supporting the solenoid clutch, and fixed on the second slider. In case that the brake pedal and the accelerator pedal are simultaneously depressed, the event is sensed by the sudden acceleration preventing apparatus and current is applied to the locking device, thereby preventing further fuel injection and preventing casualty caused by sudden acceleration.

1 Claim, 3 Drawing Sheets

APPARATUS FOR PREVENTING SUDDEN ACCELERATION OF AUTOMOBILE FITTED WITH AUTOMATIC TRANSMISSION

BACKGROUND OF THE INVENTION

1. Field of the Invention

The present invention relates to an apparatus for preventing sudden acceleration of an automobile fitted with an automatic transmission, and more particularly, to an apparatus installed between a cable connected to an accelerator pedal and a cable connected to a fuel injector of an automobile fitted with an automatic transmission, for preventing sudden acceleration of the automobile, which may occur when the accelerator pedal and a brake pedal are simultaneously depressed.

2. Description of the Related Art

Since evolution of automobiles, a variety of types of automobiles have been developed and manufactured. Recently, automobiles equipped with an automatic transmission have been developed to provide convenience and simplicity in operation. However, sudden acceleration and related accidents have become increasingly reported, thus becoming one of the most serious problems facing society today.

Sudden acceleration is phenomenon that an automobile equipped with an automatic transmission accelerates suddenly backward or forward when the automobile starts from a stop state or a parking state. It is known that such sudden acceleration mostly occurs because power is transmitted by shifting an automatic transmission after engine revolutions per minute (RPM) abruptly increase.

Accordingly, extensive research into means for preventing sudden acceleration of an automobile fitted with an automatic transmission has been recently carried out, and various means for preventing abrupt increase of RPM when an automobile fitted with an automatic transmission is started, preventing fuel supply to an engine, stopping engine actuation by interrupting power supply or for actuating a selector lever only when a brake state of an automobile is maintained by means of a shift lock device, have been proposed.

Specifically, a shift lock device allows a selector lever not to be shifted from a parking position P when a brake pedal is not depressed, and is widely used to prevent sudden acceleration.

However, known methods for preventing an abrupt increase of RPM or preventing fuel or power supply are not satisfactory in suddenly stopping an automobile when the automobile rushes backward or forward instantaneously. Also, since a shift lock device is released just by depressing a brake pedal in a state in which the automobile stops, a shift lock device cannot solve the problem of sudden acceleration occurring when a brake pedal and an accelerator pedal are simultaneously depressed at an initial startup or drive state of an automobile fitted with an automatic transmission.

SUMMARY OF THE INVENTION

To solve the above-described problems, it is an object of the present invention to provide an apparatus installed between a cable connected to an accelerator pedal and a cable connected to a fuel injector of an automobile fitted for an automatic transmission, for preventing sudden acceleration which may occur when the accelerator pedal and a brake pedal are simultaneously depressed due to a driver's mistake immediately after starting the automobile or while driving the automobile (when starting after standby of a drive signal or parking).

One aspect of the present invention is an apparatus for preventing sudden acceleration of an automobile fitted with an automatic transmission, the apparatus comprising a first slider having one end connected to a cable connected to an accelerator pedal, a second slider having one end connected to a cable connected to a fuel injector and the other end having a hollow into which the first slider is slidably inserted, and a locking device having a locking rod capable of being inserted into an insertion groove formed on the first slider through the second slider, a solenoid clutch for controlling movement of the locking rod by electric current and a locking rod reset spring for elastically supporting the solenoid clutch, and fixed on the second slider.

The apparatus is configured such that the locking device is electrically connected to actuation sensors connected to the brake pedal and the accelerator pedal, respectively.

A reset spring is installed between the first slider and a case. An air hole is formed outside the hollow of the second slider.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

The present invention will now be described in detail with reference to the accompanying drawings.

Figure 1:
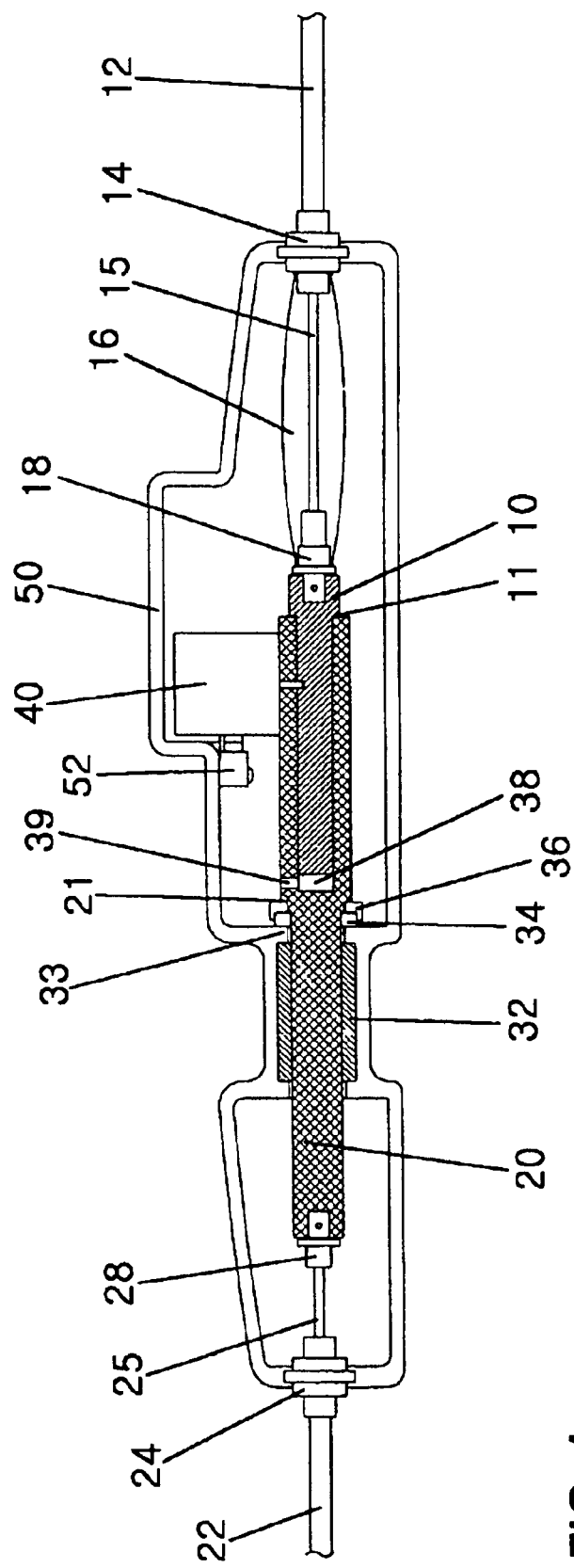
FIG. 1 is a schematic cross-sectional view of an apparatus for preventing sudden acceleration of an automobile fitted with automatic transmission according to the present invention.

FIG. 1 is a schematic cross-sectional view of an apparatus for preventing sudden acceleration of an automobile fitted with automatic transmission according to the present invention. The sudden acceleration preventing apparatus according to the present invention includes a first slider 10, a second slider 20 and a locking device 40.

One end of the first slider 10 is connected to a cable 12 connected to an accelerator pedal. One end of the second slider 20 is connected to a cable 22 connected to a fuel injector. The other end of the first slider 10 is slidably inserted into a hollow 38 formed at the other end of the second slider 20. Reference numeral 50 denotes a case of the sudden acceleration preventing apparatus according to the present invention. The cables 12 and 22 are inserted into both sides of the case 50 through first cable connectors 14 and 24, respectively. The first cable connectors 14 and 24 are fitted for sealing and moisture-proof purposes. The cables 12 and 22 inserted into the case 50 are connected to the first and second sliders 10 and 20 through second cable connectors 18 and 28, respectively. Reference numerals 15 and 25 denote cable wires for the respective cables 12 and 22.

The first slider 10 has a flange 11 at its one side so that the flange 11 is brought into contact with the leading edge of the hollow 38 when the slider 10 is slidably inserted into the hollow 38 of the second slider 20, thereby controlling sliding. A flange 21, which is stepped, is formed at a predetermined portion of the second slider 20 (around the center in the drawing) to control sliding in a predetermined direction.

In the sudden acceleration preventing apparatus having the above-described configuration, if the accelerator pedal is slowly depressed, the cable 12 connected to the accelerator pedal is operated to make the first slider 10 slide outside the hollow 38 of the second slider 20, that is, toward the cable 12. The sliding allows the reset spring 16 installed between the first slider 10 and the case 50 to be pressed and allows the second slider 20 connected to the first slider 10 by means of the locking device 40 to slide toward the cable 12. Accordingly, the operation of the cable 12 connected to the accelerator pedal actuates the cable 22 connected to the fuel injector to cause fuel injection, thereby accelerating an engine. Conversely, if the accelerator pedal is slowly released, a restoring force of the reset spring 16 makes the first slider 10 move backward to the cable 22. Then, the flange 11 formed at the first slider 10 is brought into contact with the leading edge of the hollow 38 of the second slider 20 and the second slider 20 moves backward. Accordingly, fuel injection is cut off by the action of the cable 22, decelerating the automobile, which will later be described in more detail. In the drawing, the first slider 10, the second slider 20 and the locking device 40 are all set to reverse positions, and the reset spring 16 is preferably a spring having a centrally bulgy portion to have a good restoring force.

Figure 2:
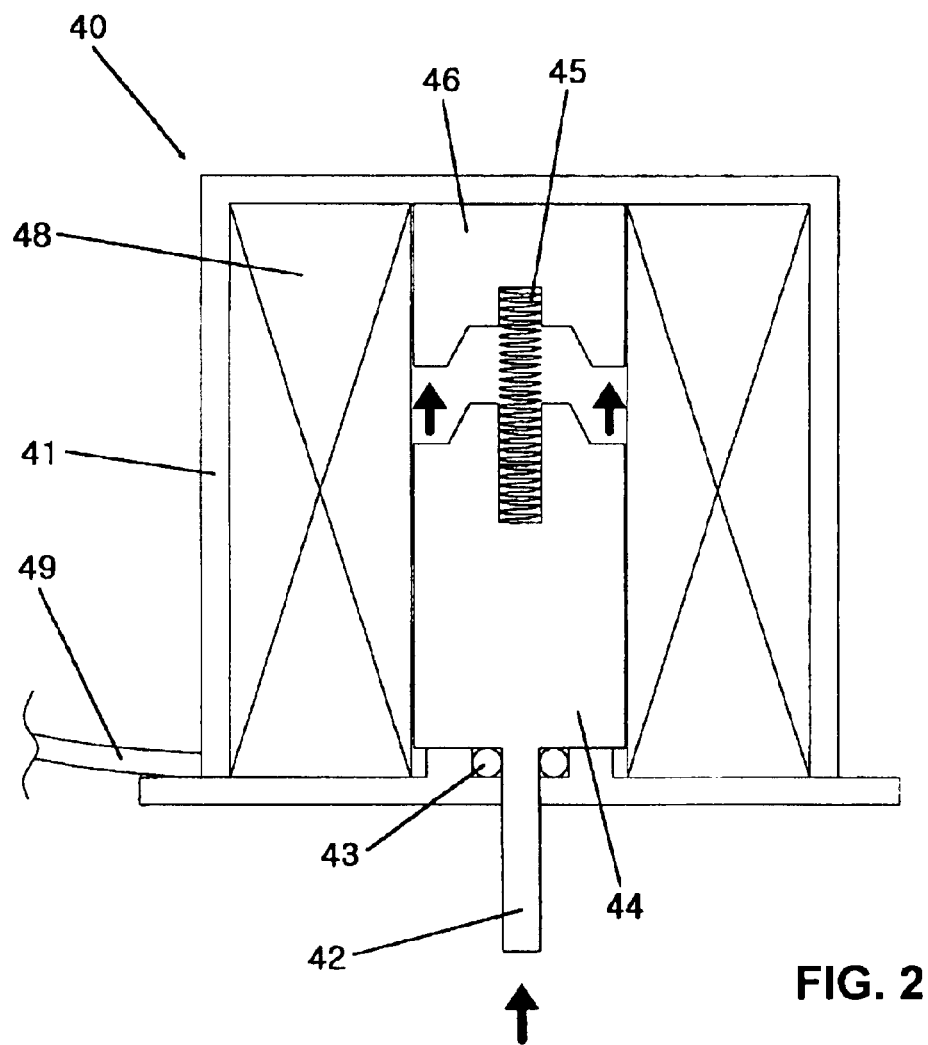
FIG. 2 is a schematic cross-sectional view of a locking device according to the present invention.

FIG. 2 is a schematic cross-sectional view of a locking device according to the present invention. A locking device 40 fixed on the outer surface of the second slider 20 includes a locking rod 42 capable of being inserted into an insertion groove formed on the first slider 10 through the second slider 20, a solenoid clutch 44 for controlling movement of the locking rod 42 by electric current and a locking rod reset spring 45 for elastically supporting the solenoid clutch 44. A front end of the locking rod 42 is inserted into an insertion hole formed correspondingly to the shape of the locking rod 42 from the second slider 20 to the insertion groove formed on the first slider 10. Linear movement of the locking rod 42 will now be briefly described. When a current flows in the locking device 40, the solenoid clutch 44 is actuated to make the locking rod reset spring 45 and the locking rod 42 connected thereto sequentially withdraw. Arrows shown in FIG. 2 indicate regressive directions. In more detail, a coil 48 disposed inside a locking device case 41 withdraws the solenoid clutch 44 having the locking rod 42 in the direction indicated by the arrows by the action of the current externally applied. If current flow is interrupted, the actuation of the solenoid clutch 44 is stopped and the locking rod reset spring 45 advances in the opposite direction by a restoring force. Accordingly, the front end of the locking rod 42 is inserted into the insertion groove formed on the first slider 10, thereby fastening the first slider 10 and the second slider 20, as shown in FIG. 1. The solenoid clutch 44 having the locking rod 42 is spaced apart a predetermined distance from a bottom 46 by the locking rod reset spring 45. Reference numeral 43 denotes an O-ring for sealing the case 41, and reference numeral 49 denotes an electric cable.

The locking device 40 is connected to a micro switch 52 for sensing the actuation of the accelerator pedal fixed on the inner surface of the case 50 by means of an extensible means (not shown) and is tightly fixed on the outer surface of the second slider 20. Accordingly, when the first and second sliders 10 and 20 slide left and right in a state in which the locking rod 42 passes through the insertion hole formed in the second slider 20 to then be inserted into the insertion groove formed on the first slider 10, the locking device 40 moves left and right inside the case 50.

As described above, in a state in which the locking rod 42 withdraws so that the front end of the locking rod 42 is inserted only into the insertion hole formed in the second slider 20, even if the accelerator pedal is actuated, the actuation thereof is not transmitted to the second slider 20 through the first slider 10 connected to the cable 12, which is not transmitted to the fuel injector through the cable 22, thereby automatically interrupting acceleration of the engine. However, during a normal state in which the front end of the locking rod 42 advances by the locking rod reset spring 45 to then be inserted into the insertion groove formed on the first slider 10 through the second slider 20, the actuation of the accelerator pedal is transmitted to the fuel injector through the first and second sliders 10 and 20, thereby normally accelerating the engine. If necessary, an air hole 39 is formed outside the hollow 38 of the second slider 20, thereby facilitating sliding of the first slider 10. Reference numeral 32 denotes a bush installed for preventing abrasion due to sliding of the second slider 20, and reference numerals 34 and 36 denote a sealing ring and a cover ring of the flange 21, respectively.

Figure 3:
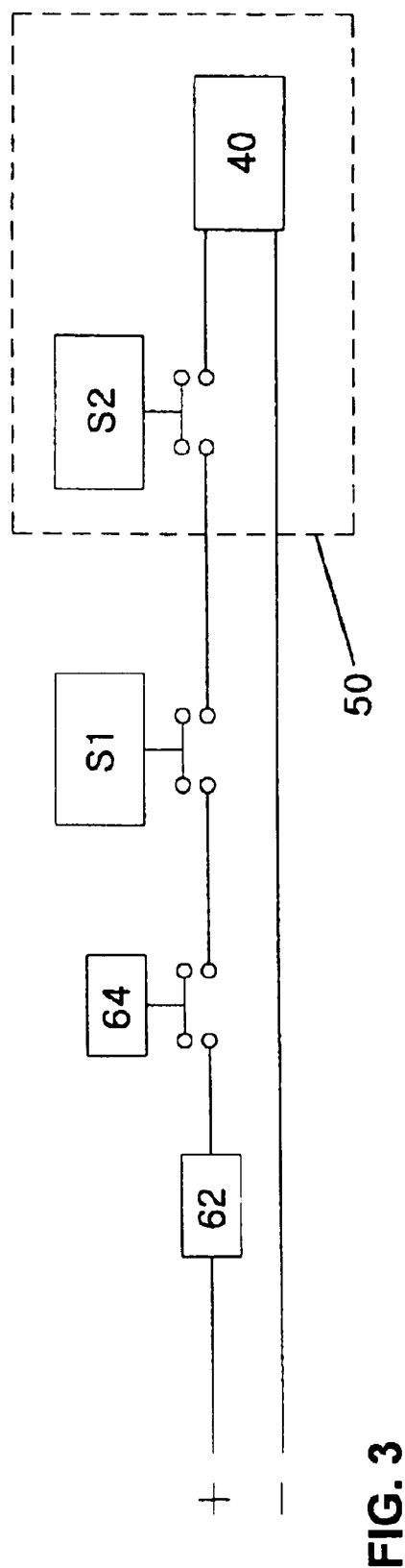
FIG. 3 is a schematic circuit diagram showing an operating procedure of the apparatus for preventing sudden acceleration of an automobile fitted with automatic transmission according to the present invention.

FIG. 3 is a schematic circuit diagram showing an operating procedure of the apparatus for preventing sudden acceleration of an automobile fitted with automatic transmission according to the present invention. Referring to FIG. 3, a method for preventing sudden acceleration of an automobile fitted with an automatic transmission according to the present invention comprises a step of sensing simultaneous actuation of the brake pedal and the accelerator pedal by actuation sensors S1 and S2, respectively. Also, the method comprises a step of applying current to the locking device 40 electrically connected to the brake pedal and the accelerator pedal by the sensing step, a step of actuating the solenoid clutch 44 by the current applied to the locking device 40, and a step of interrupting an action transmitted from the accelerator pedal to the fuel injector by the actuation of the solenoid clutch 44.

In more detail, in order to switch a selector lever to a reverse or drive position after an automobile start-up, it is general to release the brake pedal and depress the accelerator pedal. However, in case that a driver's right foot is incompletely stepped on the accelerator pedal, the brake pedal and the accelerator pedal may be simultaneously depressed. If the actuation sensors S1 and S2 installed in the brake pedal and the accelerator pedal, respectively, sense such an event, current may instantaneously flow in the locking device 40 electrically connected to these pedals, thereby actuating the solenoid clutch 44. Thus, the solenoid clutch 44 withdraws to press the locking rod reset spring 45 and the locking rod 42 in the solenoid clutch 44 is then withdrawn. At this time, the front end of the locking rod 42 is separated from the inserted groove formed on the first slider 10 so that it remains the insertion hole formed in the second slider 20. In this state, even if the accelerator pedal is depressed, the cable 12 connected to the accelerator pedal slides only the first slider 10, thereby disabling further fuel injection from the fuel injector connected to the second slider 20. Finally, actuation is not transmitted to the fuel injector through the cable 22, thereby interrupting acceleration of the engine. The first slider 10 sliding outside the hollow 38 of the second slider 20 is restored to its original position by the restoring force of the reset spring 16.

If the accelerator pedal is released, as the solenoid clutch 44 is actuated, the locking rod reset spring 45 advances so that the front end of the locking rod 42 passes through the second slider 20 to then be inserted into the insertion groove formed on the first slider 10. Accordingly, the first slider 10 and the second slider 20 are connected by means of the locking rod 42. As the accelerator pedal is actuated, the first and second sliders 10 and 20 slide together and fuel is injected from the fuel injector, thereby normally actuating the engine.

The sudden acceleration preventing apparatus for an automobile fitted with an automatic transmission according to the present invention can be configured to activate a warning light separately installed in the automobile and to instantaneously interrupt sudden acceleration of an engine when a brake pedal and an accelerator pedal are simultaneously depressed. If the accelerator pedal is released after the sudden acceleration is interrupted, fuel is normally injected. Undefined reference numerals 62 and 64 are a fuse box and a maintenance switch. The actuation sensors S1 and S2 installed for the purpose of sensing actuation of the respective pedals may be either a contact type or a non-contact type. For example, in the embodiment of the present invention, the micro switch 52 is installed inside the case 50 as the actuation sensor S2 for sensing actuation of the accelerator pedal.

In an apparatus for preventing sudden acceleration of an automobile fitted with an automatic transmission, in order to switch a selector lever to a reverse or drive position after an automobile start-up, it is general to release the brake pedal and depress the accelerator pedal. However, in the case that a driver's right foot is incompletely stepped on the accelerator pedal so that the brake pedal and the accelerator pedal are simultaneously depressed, the event is sensed by the sudden acceleration preventing apparatus according to the present invention and current is applied to the locking device, thereby preventing further fuel injection to interrupt acceleration of an engine. Therefore, danger of sudden acceleration occurring when an automobile starts from a stop state or a parking state can be prevented, and driver's possible damage or injury due to sudden acceleration can be reduced. Also, since the sudden acceleration preventing apparatus according to the present invention can be mounted on all kinds of automobiles fitted with an automatic transmission and can be easily installed at a cable between existing accelerator and brake pedals, the cost can be reduced. Further, even if a distance between the accelerator pedal and the brake pedal is reduced, safe driving can be achieved. Even when a driver inadvertently steps on the accelerator pedal and the brake pedal simultaneously in confusion when, for example, an obstacle is suddenly detected or a stop (red) signal is instantaneously blinked, a braking force is larger than a driving force. Therefore, even if the accelerator pedal is mistakenly depressed instead of the brake pedal, acceleration of an engine can be interrupted, thereby preventing casualty caused by sudden acceleration.

Although the invention has been described above by reference to a certain embodiment of the invention, the invention is not limited to the embodiment described above and can be embodied by combination of various types of members. Modifications and variations of the embodiment described above will occur to those skilled in the art without departing from the spirit and scope of the invention as defined by the appended claims.

What is claimed is:

1. An apparatus for preventing sudden acceleration of an automobile fitted with an automatic transmission, comprising:

a first slider having one end thereof connected to a cable connected to an accelerator pedal;

a second slider having one end thereof connected to a cable connected to a fuel injector and the other end thereof having a hollow into which the first slider is slidably inserted; and a locking device having a locking rod capable of being inserted into an insertion groove formed on the first slider through the second slider, a solenoid clutch for controlling movement of the locking rod by electric current and a locking rod reset spring for elastically supporting the solenoid clutch, and fixed on the second slider, a case for housing said locking device and said first and second slider in a moisture and/or dust proof environment such that upon installation of said case in an automobile said apparatus will not be exposed to moisture and/or dust;

wherein the locking device is electrically connected from within said case to actuation sensors connected to the brake pedal and the accelerator pedal, respectively wherein an air hole is formed outside the hollow of the second slider, wherein a reset spring is installed between the first slider and said case.

* * * * *